(12) United States Patent
Dejneka et al.

(10) Patent No.: US 6,515,795 B1
(45) Date of Patent: Feb. 4, 2003

(54) BOROSILICATE CLADDING GLASSES FOR GERMANATE CORE THULIUM-DOPED AMPLIFIERS

(75) Inventors: Matthew J. Dejneka, Corning, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/897,833

(22) Filed: Jun. 29, 2001

(51) Int. Cl.$^7$ .......................... H01S 3/067; C03C 3/068; C03C 13/04
(52) U.S. Cl. ...................... 359/341.5; 359/343; 501/37; 501/65; 501/77; 501/78
(58) Field of Search ................... 359/333, 341.1–341.5, 359/343; 501/37, 65, 77, 78

(56) References Cited

U.S. PATENT DOCUMENTS

| | | | |
|---|---|---|---|
| 3,957,342 A | 5/1976 | Newns et al. | |
| 4,868,141 A | 9/1989 | Fine | |
| 4,973,565 A | 11/1990 | Fine | |
| 5,004,707 A | 4/1991 | Ross et al. | |

FOREIGN PATENT DOCUMENTS

| | | |
|---|---|---|
| WO | WO 98/58884 | 12/1998 |

OTHER PUBLICATIONS

J. Y. Allain et al., *Tunable CW Lasing Around 0•82, 1•48, 1•88, and 2•35 μm In Thulium–Doped Fluoriozirconate Fibre*, Electronics Letters, Nov. 23, 1989, pp. 1660–1662, vol. 25–No. 24.

S. Bayya et al., *BaO–Ga$_2$O$_3$–GeO$_2$ glasses with enhanced properties*, Journal of Non–Crystalline Solids, 1997, pp. 198–207, vol. 212, Elsevier Science B.V.

D. A. Chapman, *Erbium–doped fibre amplifiers: the latest revolution in optical communications*, Electronics & Communication Engineering Journal, Apr. 1994, pp. 59–67, vol. 6–No. 2, IEE.

J. Heo et al., *Spectroscopic analysis of Tm$^{3+}$ in PbO–Bi$_2$O$_3$–Ga$_2$O$_3$ glass*, Applied Optics, Jul. 20, 1995, pp. 4284–4289, vol. 34–No. 21.

P. L. Higby et al., *Properties of barium gallium germanate glasses*, Journal of Non–Crystalline Solids, 1993, pp. 303–308, vol. 163, North Holland.

J. M. Jewell et al., *Properties of BaO–R$_2$O$_3$–Ga$_2$O$_3$–GeO$_2$ (R=Y, Al, La, and Gd) Glasses*, Journal of the American Ceramic Society, Mar. 1994, pp. 697–700, vol. 77–No. 3.

M. Krishna Murthy et al., *Some Physical Properties of Alkali Germanate Glasses*, Nature, Jan. 18, 1964, pp. 285–286, vol. 201–No. 4916.

M. K. Murthy et al., *Properties and structure of glasses in the system M$_2$O–Ga$_2$O$_3$–GeO$_2$ (M= Li, Na, K)*, Physics and Chemistry of Glasses, Feb. 1, 1967, pp. 26–29, vol. 8–No. 1.

T. Sakamoto et al., *1.4–μm–Band Gain Characteristics of a Tm–Ho–Doped ZBLYAN Fiber Amplifier Pumped in the 0.8–μm Band*, IEEE Photonics Technology Letters, Sep. 9, 1995, pp. 983–985, vol. 7–No. 9.

Primary Examiner—David Sample
Assistant Examiner—Elizabeth A Bolden
(74) Attorney, Agent, or Firm—Foley & Lardner

(57) ABSTRACT

A borosilicate glass composition comprises SiO$_2$ having a concentration of about 40 mole percent to about 60 mole percent, B$_2$O$_3$ having a concentration of about 10 mole percent to about 30 mole percent, and an alkaline earth and/or alkali compound having a concentration of 10 mole percent to about 40 mole percent. An optical fiber amplification device comprises a borosilicate glass material cladding. The core comprises a germanate glass material doped with Tm$^{3+}$. The germanate glass material has a first surface configured to receive an optical signal having a wavelength of from about 1400 nm to about 1540 nm and a second surface configured to output an amplified optical signal. In this manner, low cost fiber amplifiers in the 1450–1530 nm wavelength region (corresponding to the S-band) can be achieved.

12 Claims, 5 Drawing Sheets

BOROSILICATE CLADDING GLASSES FOR GERMANATE CORE THULIUM-DOPED AMPLIFIERS

BACKGROUND OF THE INVENTION

1. Field of the Invention

This invention generally relates to the field of glass compositions and devices for optical amplification.

2. Description of the Related Art

In optical telecommunications networks, high bandwidth is desired for applications such as the Internet, video on demand, and videophone. In many optical communications systems, optical signals having wavelengths in the range 1530–1560 nanometers (nm) are utilized. This wavelength range corresponds to the "C-band" in telecommunications. This wavelength range also corresponds to a minimum attenuation region for silica and silica-based fibers.

Optical amplifiers are utilized to amplify the optical signals in those wavelength regions. Conventional optical amplifiers for telecommunications include erbium (Er)-doped silicate glass. The Er-doped silicate glass optical amplifier operates in the C-band and can also amplify optical signals in the 1570 nm–1620 nm range (also referred to as the L-band).

In order to increase optical bandwidth, more wavelengths will need to be transmitted. One wavelength range of interest is the 1460 nm–1520 nm wavelength band, often referred to as the "S-band." However, this wavelength band is outside of the Er-based material amplification range.

Within the 1460 nm–1520 nm wavelength band, trivalent thulium ($Tm^{3+}$) has an emission band centered at about 1470 nm. With respect to the $Tm^{3+}$ energy levels, the $^3H_4$–$^3F_4$ transition in $Tm^{3+}$ corresponds to the emission at about 1470 nm. In order to generate a population in the $^3H_4$ energy level, for example, 790 nm radiation is absorbed by the $Tm^{3+}$ material, whereby ions are transferred to the $^3H_4$ excited state from the $^3H_6$ ground state.

Tm-doped silicate glass has an excited state lifetime (for the $^3H_4$ level) of about 10 microseconds, due to the quenching of the upper level in silicate hosts. This short lifetime is less preferable for laser and amplification applications. Similarly, other Tm hosts, such as phosphate glass and borate glass, are also less preferable because $Tm^{3+}$ is quenched by the high phonon energy of these glasses.

A thulium-doped germanate glass suitable for making S-band amplifying optical fiber is described in the commonly owned and copending U.S. Patent Application entitled "Thulium-Doped Germanate Glass Composition and Device for Optical Amplification," by Dejneka, et al., which is incorporated herein by reference. While core and cladding compositions may be made from these materials, and suitable fibers drawn, the expense of the germanate starting materials is significant. As such, fibers with both core and cladding made from germanate materials are not economical to produce. As the light amplification occurs in the core of the fiber, and the glass portion of the fiber is over 99% cladding material, it is highly desirable to use a less expensive glass as the cladding. Such a glass must be property-matched to the germanate core.

Thus, there remains a need for a property-matched cladding material for thulium-doped germanate core optical fibers.

SUMMARY OF THE INVENTION

In view of the foregoing, according to one embodiment of the present invention, a borosilicate glass composition comprises $SiO_2$ having a concentration of about 40 mole percent to about 60 mole percent; $B_2O_3$ having a concentration of about 10 mole percent to about 30 mole percent; and a first compound selected from the group consisting of MgO, CaO, SrO, BaO, $BaF_2$, $MgF_2$, $CaF_2$, $SrF_2$, $BaCl_2$, $MgCl_2$, $CaCl_2$, $SrCl_2$, $BaBr_2$, $MgBr_2$, $CaBr_2$, $SrBr_2$, $Li_2O$, $Na_2O$, $K_2O$, $Rb_2O$, $Cs_2O$, LiF, NaF, KF, RbF, CsF, LiCl, NaCl, KCl, RbCl, CsCl, LiBr, NaBr, KBr, RbBr, CsBr, and combinations thereof, and having a concentration of 10 mole percent to about 40 mole percent.

According to another embodiment of the present invention, an optical fiber amplification device comprises a borosilicate glass material cladding. The core comprises a germanate glass material doped with $Tm^{3+}$. The germanate glass material has a first surface configured to receive an optical signal having a wavelength of from about 1400 nm to about 1540 nm and a second surface configured to output an amplified optical signal. The borosilicate glass material can have the composition described above.

The borosilicate cladding glass described herein results in a number of advantages. Fore example, it is about 50 times less expensive than a germanate based material. It is property-matched to the germanate core, and has an index suitable for the production of fiber with germanate core materials.

Other advantages and novel features of the present invention will become apparent from the following detailed description of the invention when considered in conjunction with the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

DETAILED DESCRIPTION OF THE PREFERRED EMBODIMENTS

Figure 1:
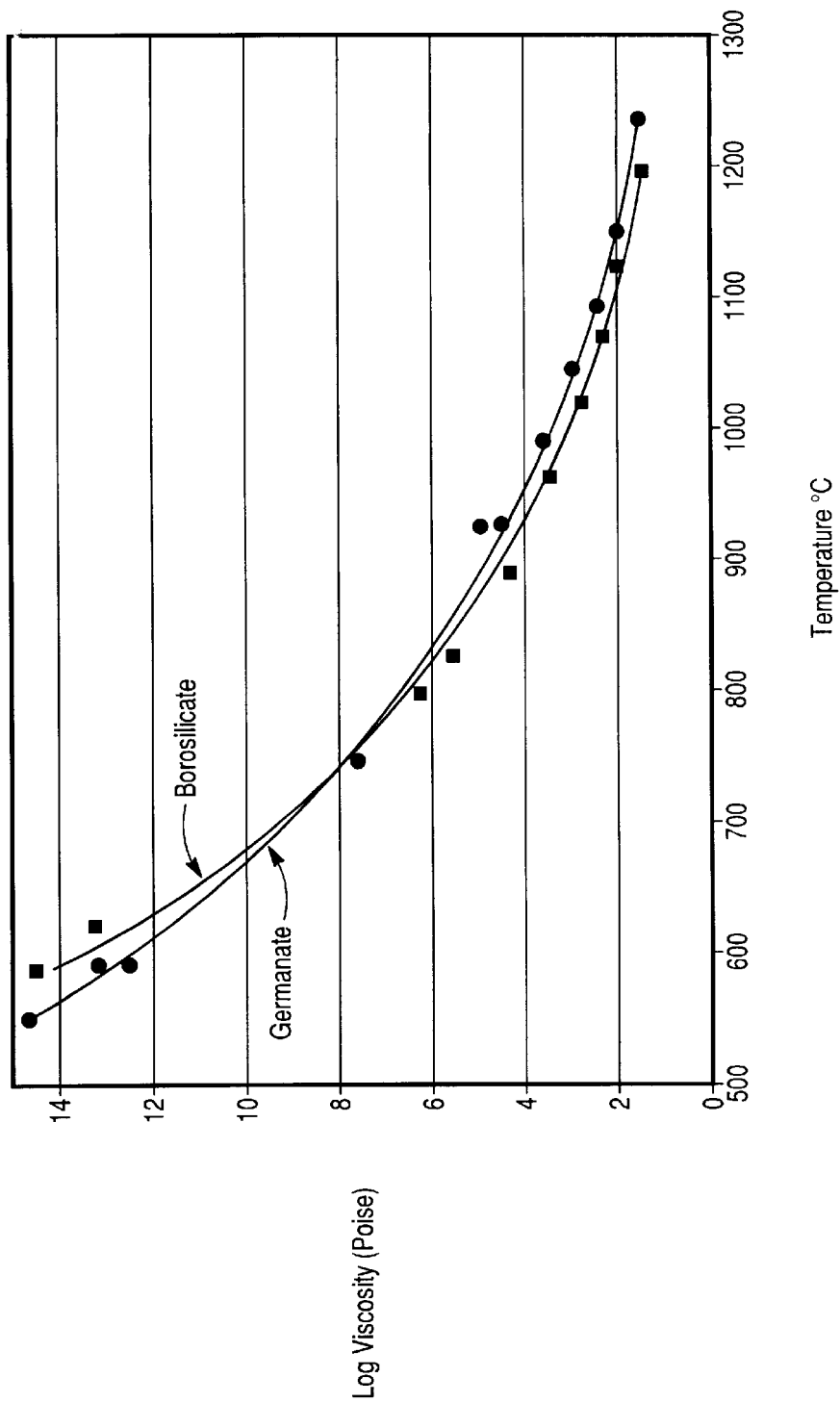
FIG. 1 shows viscosity curves of a borosilicate glass material according to an embodiment of the present invention in comparison to a germanate glass material.

The present invention is related to a borosilicate glass material. In particular, the borosilicate glass material has suitable refractive index characteristics so that it can be incorporated as a cladding material around a Tm-doped germanate glass core that can be utilized as a wide band optical amplifier in the 1460 nm–1520 nm wavelength band.

In the commonly pending and co-owned application by Dejneka et al. entitled "Thulium-Doped Germanate Glass Composition and Device For Optical Amplification," which is incorporated herein by reference, an inventive Tm-doped germanate glass material is described. In order to utilize this germanate material in commercial fiber amplifier applications, it is desirable to minimize production and fabrication costs as much as possible. Germanium oxide costs about $5/gram. This material cost can ultimately raise the manufacturing cost of a fiber amplifier using a Tm-doped germanate glass core and cladding.

Since the fiber is over about 99% cladding by volume, it is desirable to lower the cost of the cladding material. As the inventors have determined, a lower-cost borosilicate cladding glass composition comprising widely available oxides can be produced. According to a preferred embodiment, the borosilicate glass is property matched (e.g., index of refraction matched and viscosity versus temperature matching) to the germanate core and enables the attainment of low-loss single mode fiber. In addition, the borosilicate cladding glass is stable, provides good fiber strength, and can be doped to absorb damaging UV light from the polymer coating curing lights on the fiber draw.

According to a first embodiment of the present invention, a borosilicate composition is provided. The borosilicate composition is a glass having a $SiO_2$ glass former and a non-zero concentration of $B_2O_3$. $SiO_2$ is preferable in a concentration of about 40 mole % to about 60 mole %, with a concentration of about 45 mole % to about 50 mole % being preferred. By "about" it is meant within + or –1.0%.

The $B_2O_3$ compound can be introduced into the silicate as a concentration of about 10 mole % to about 30 mole percent, with a preferred concentration of about 15 mole % to about 25 mole %.

The borosilicate composition also includes, a non zero concentration of alkaline earth metal compounds and/or alkali metal compounds. For example, the alkaline earth compounds can include BaO, MgO, CaO, SrO, $BaF_2$, $MgF_2$, $CaF_2$, $SrF_2$, $BaCl_2$, $MgCl_2$, $CaCl_2$, $SrCl_2$, $BaBr_2$, $MgBr_2$, $CaBr_2$, and $SrBr_2$, and combinations thereof. For use herein, AO is a general alkaline earth metal oxide, and $AX2$ is a general alkaline earth metal halide. The alkaline earth metal compound has a concentration of about 0 mole % to about 40 mole %, with a preferred concentration being about 20 mole % to about 30 mole %. For example, MgO, CaO, SrO, and/or BaO can be present in concentrations of about 0 mole % to about 40 mole %. In particular, MgO can be present in concentrations of about 0 mole % to about 5 mole %, CaO can be present in concentrations of about 5 mole % to about 15 mole percent %, SrO can be present in concentrations of about 0 mole % to about 15 mole %, and BaO can be present in concentrations of about 10 mole % to about 30 mole %. One or more of each of these compounds can be included in the borosilicate composition. In a preferred aspect of this embodiment, BaO or CaO is utilized because Ba and Ca provide good index matching and glass stability.

The alkaline earth metal compounds can also help provide acceptable chemical durability for the borosilicate material. Further, alkaline earth metal halides such as, for example, $BaF_2$, $CaCl_2$, and $CaBr_2$, can act as drying agents to strip out —OH during the melting process. These compounds are also preferable as they can be used to viscosity match the borosilicate clad to a germanate core.

Figure 5:
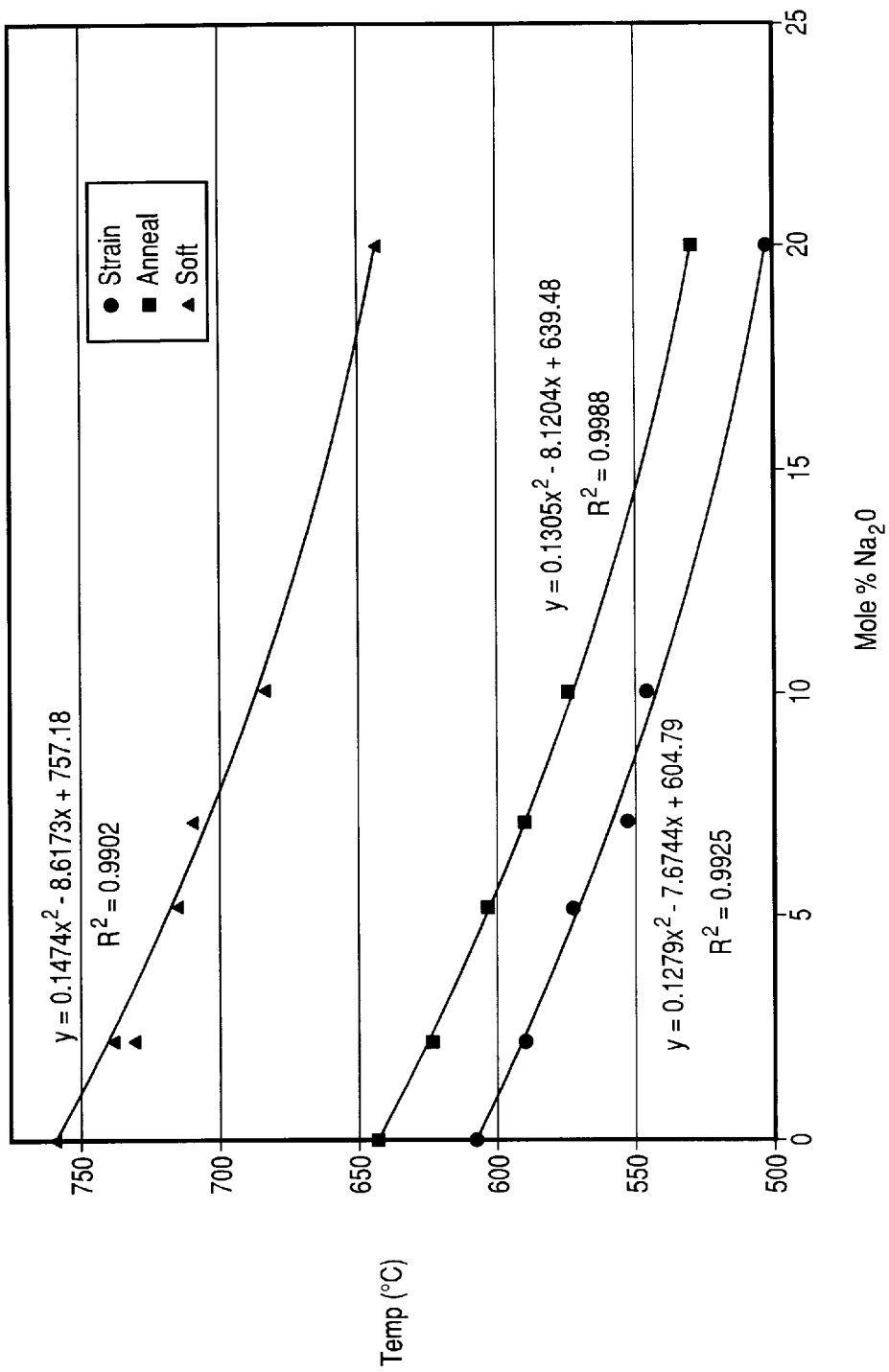
FIG. 5 shows a plot of annealing temperature, strain temperature and softening point temperature as a function of $Na_2O$ modifier concentration.

Alkali metal compounds can also be included in the borosilicate composition to optimize glass stability and match the physical properties of the germanate core (e.g., expansion, viscosity, index, etc.). These alkali oxide compounds can include, for example, $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, and $Cs_2Br_2$, and combinations thereof. For use herein, $Z_2O$ is a general alkali metal oxide, and $Z_2X_2$ is a general alkali metal halide. The halides are represented as $Z_2X_2$ so that they have the same stoichiometry as the oxide. The person of skill in the art will recognize that $Z_2X_2$ is chemically identical to ZX; for example, $Na_2Cl_2$ is sodium chloride. The alkali metal compound has a concentration of about 0 mole % to about 35 mole %, with a preferred concentration being about 2 mole % to about 12 mole %. In particular, for example, $Li_2O$ can be present in concentrations of about 0 mole % to about 20 mole %, with a 0% concentration preferred. $Na_2O$ can be present in concentrations of about 0 mole % to about 35 mole percent %, with a concentration of about 2 mole % to about 12 mole % being preferred. $K_2O$ can be present in concentrations of about 0 mole % to about 35 mole %, with a concentration of about 1 mole % to about 7 mole % being preferred. $Rb_2O$ can be present in concentrations of about 0 mole % to about 20 mole %, with a concentration of about 0 mole % to about 2 mole % being preferred. For example, as shown in FIG. 5, the annealing temperature, strain temperature, and softening point temperature of the borosilicate can vary based on the concentration of $Na_2O$. Similar variations in these parameters can also be measured for other additives of the borosilicates. Further, alkali metal halides such as, for example, $Na_2F_2$, $K_2Cl_2$, and $Rb_2Br_2$ can act as drying agents to strip out —OH during the melting process.

The combination of alkaline earth metal compounds and/or alkali metal compounds is represented in Table I by the equation $AO+AX_2+Z_2O+Z_2X_2$. Preferably, the total concentration of alkaline earth metal compounds and alkali metal compounds in the borosilicate material is about 10 mole % to about 40 mole %, with a concentration of about 20 mole % to about 30 mole % being preferred. Here, A can be an alkaline earth metal such as Mg, Ca, Sr, or Ba, and Z can be an alkali metal such as Li, Na, K, Rb, or Cs. This combination can include any variation of the alkaline-earth compounds and/or alkali oxide compounds described above.

Also, intermediate elements and compounds (e.g., $Ta_2O_5$, $GeO_2$, $Nb_2O_5$, $Al_2O_3$, $Ga_2O_3$, $Sb_2O_3$, $As_2O_3$, $Fe_2O_3$, and $CeO_2$) can be included in the concentration range listed in Table I below. For example, $Ta_2O_5$ and $Nb_2O_5$ can be incorporated in sufficient amounts to increase the index of refraction of the borosilicate material. $Al_2O_3$ can be incorporated in sufficient amounts to provide increased durability and/or decrease the borosilicate host index of refraction, if used in appropriate amounts. $Ga_2O_3$ can also be used for these purposes. $Sb_2O_3$, $As_2O_3$, and/or $CeO_2$ can be incorporated in the borosilicate glass as refining agents to help remove bubbles from the glass during formation. $CeO_2$ can also be utilized to provide UV light absorption and to protect the core from UV damage. As one of skill in the art will appreciate, $Fe_2O_3$ is desirably used only in an overclad composition, where it can strip cladding modes due to its high extinction coefficient.

Compounds such as $La_2O_3$ (or $RE_2O_3$, where RE represents all rare earth elements, such as La, Nd, Pr, Er, Y, Dy, Yb, Er, Sm, Gd, Lu, etc.), ZnO, $TiO_2$, $ZrO_2$, and $HfO_2$ can be incorporated in borosilicate host for various other purposes. For example, $La_2O_3$, $Gd_2O_3$, $Y_2O_3$, and $Lu_2O_3$ are transparent at the wavelength of interest and can help control refractive index and expansion.

Additionally, heavy metal oxides and compounds (e.g., PbO and/or $Bi_2O_3$) can be incorporated into the borosilicate material to control refractive index, expansion, viscosity and glass stability.

In particular, the borosilicate glass material of a preferred embodiment can include one or more variations of the following composition: $SiO_2+B_2O_3+((AO$ or $AF_2)+(Z_2O+Z_2X_2)+$(optionally) one or more intermediate compounds, where A can be an alkaline earth metal such as Mg, Ca, Sr, or Ba, and X can be an alkali metal such as Li, Na, K, Rb, or Cs. This composition provides a suitable index match for a germanate core and acceptable chemical durability.

Table I shows preferable and preferred ranges of concentrations of the aforementioned borosilicate glass composition constituents and others.

TABLE I

Borosilicate Composition Concentrations

| Component | Concentration Ranges, including preferable and preferred ranges (in mole percent) |
|---|---|
| $B_2O_3$ | $10\% \leq B_2O_3 \leq 30\%$ (preferable), $15\% \leq B_2O_3 \leq 25\%$ (preferred) |
| $SiO_2$ | $40\% \leq SiO_2 \leq 60\%$ (preferable), $45\% \leq SiO_2 \leq 50\%$ (preferred) |
| $Ga_2O_3$ | $0\% \leq Ga_2O_3 \leq 20\%$ (preferable), $0\%\ Ga_2O_3$ (preferred) |
| $Al_2O_3$ | $0\% \leq Al_2O_3 \leq 20\%$ (preferable), $2\% \leq Al_2O_3 \leq 10\%$ (preferred) |
| $Ga_2O_3 + Al_2O_3$ | $0\% \leq Ga_2O_3 + Al_2O_3 \leq 20\%$ (preferable), $2\% \leq Ga_2O_3 + Al_2O_3 \leq 10\%$ (preferred) |
| $GeO_2$ | $0\% \leq GeO_2 \leq 20\%$ (preferable), $0\%\ GeO_2$ (preferred) |
| ZnO | $0\% \leq ZnO \leq 40\%$ (preferable), $0\% \leq ZnO \leq 5\%$ (preferred) |
| PbO | $0\% \leq PbO \leq 50\%$ (preferable), $0\% \leq PbO \leq 10\%$ (preferred) |
| $AO + AX_2$ | $0\% \leq AO + AX_2 \leq 40\%$ (preferable), 20%–30% (preferred AO), 0%–5% (preferred MgO), 5%–15% (preferred CaO), 0%–15% (preferred SrO), 10%–30% (preferred BaO) |
| $Z_2O + Z_2X_2$ | $0\% \leq Z_2O + Z_2X_2 \leq 20\%$ (preferable), 4%–6% (preferred $Z_2O$), 0% (preferred $Li_2O$), 0% (preferred $Na_2O$), 2%–4% (preferred $K_2O$), 2%–4% (preferred Rb2O), 2%–4% (preferred $Cs_2O$) |
| $AO + AX_2 + Z_2O + Z_2X_2$ | $10\% \leq AO + AX_2 + Z_2O + Z_2X_2 \leq 40\%$ (preferable), $20\% \leq AO + AX_2 + Z_2O + Z_2X_2 \leq 30\%$ (preferred) |
| $RE_2O_3$ | $0\% \leq RE_2O_3 \leq 5\%$ (preferable), $0\% \leq RE_2O_3 \leq 2\%$ (preferred) |
| $Nb_2O_5$ | $0\% \leq Nb_2O_5 = 10\%$ (preferable), $0\%\ Nb_2O_5$ (preferred) |
| $Ta_2O_5$, | $0\% \leq Ta_2O_5 \leq 5\%$, $0\% \leq Ta2O5 \leq 1\%$ (preferred), |
| $Sb_2O_3$ | $0\% \leq Sb_2O_3 \leq 5\%$ (preferable), $0\% \leq Sb_2O_3 \leq 1\%$ (preferred) |
| $As_2O_3$ | $0\% \leq As_2O_3 <5\%$ (preferable), $0\% \leq As_2O3 \leq 1\%$ (preferred) |

TABLE I-continued

Borosilicate Composition Concentrations

| Component | Concentration Ranges, including preferable and preferred ranges (in mole percent) |
|---|---|
| $CeO_2$ | $0\% \leq CeO_2 \leq 5\%$ (preferable), $0\% \leq CeO_2 \leq 2\%$ (preferred) |
| $AX_2 + Z_2X_2$ | $0\% \leq AX_2 + Z_2X_2 \leq 10\%$ (preferable), $0.1\% \leq AX_2 + Z_2X_2 \leq 4\%$ (preferred) |
| $TiO_2 + ZrO_2 + HfO_2$ | $0\% \leq TiO_2 + ZrO_2 + HfO_2 \leq 10\%$ (preferable), $0\% \leq TiO_2 + ZrO_2 + HfO_2 \leq 1\%$ (preferred) |

The above table lists many compounds, but is not intended as an exhaustive list. For example, other compounds, such as $Fe_2O_3$ can be added to an overclad glass composition to strip cladding modes in the fiber, as would be apparent to one of ordinary skill in the art given the present description.

In accordance with the borosilicate glass compositions described above, many variations of component concentrations were tested and samples produced. The glasses were made as described below. The following Tables II–VI list component concentrations (in mole percent) for variations of a borosilicate glass composition The variations listed include samples AQS-ATQ.

TABLE II

Samples AQS–AQX

| Glass 164 | AQS | AQT | AQU | AQV | AQW | AQX |
|---|---|---|---|---|---|---|
| $SiO_2$ | 48 | 48 | 43 | 53 | 48 | 48 |
| BaO | 28 | 33 | 28 | 28 | 28 | 28 |
| $BaCl_2$ | 2 | 2 | 2 | 2 | 2 | 2 |
| $B_2O_3$ | 20 | 15 | 20 | 20 | 20 | 20 |
| $Al_2O_3$ | 2 | 2 | 2 | 2 | 0 | 5 |
| $Nd_2O_3$ | 0.1 | 0.1 | 0.1 | 0.1 | 0.1 | 0.1 |
| Strain, ° C. | N/A | N/A | 603 | 612 | 611 | 606 |
| Anneal, ° C. | N/A | N/A | 637 | 646 | 646 | 641 |
| Softening Pt., ° C. | 758 | N/A | 745 | 759 | 760 | 759 |
| Expansion × $10^7$, 1/° C. | N/A | N/A | N/A | 77.6 | N/A | N/A |
| Density, g/mL | N/A | N/A | 3.606 | 3.494 | 3.6 | 3.492 |
| Ref Index | N/A | N/A | 1.625 | 1.615 | 1.62 | 1.61 |

TABLE III

Samples ARC–ARO

| Series 164 | ARC | ARD | ARE | ARG | ARH | ARI | ARJ | ARO |
|---|---|---|---|---|---|---|---|---|
| $SiO_2$ | 48 | 48 | 48 | 48 | 48 | 48 | 53 | 48 |
| BaO | 18 | 8 | 0 | 26 | 23 | 14 | 16 | 26 |
| $BaCl_2$ | 2 | 2 | 0 | 2 | 2 | 2 | 2 | 2 |
| $Na_2O$ | 10 | 20 | 30 | 2 | 5 | 8 | 8 | 2 |
| $B_2O_3$ | 20 | 20 | 20 | 20 | 20 | 20 | 18 | 20 |
| $Al_2O_3$ | 5 | 5 | 5 | 5 | 5 | 10 | 4 | 5 |
| $Nd_2O_3$ | 0.1 | 0.1 | 0.1 | 0.1 | 0.1 | 0.1 | 0.1 | 0.1 |
| Strain, ° C. | 545 | 502 | N/A | 589 | 571 | 525 | N/A | N/A |
| Anneal, ° C. | 573 | 529 | N/A | 622 | 602 | 553 | N/A | N/A |
| Softening Pt., ° C. | 682 | 644 | N/A | 737 | 716 | 667 | N/A | N/A |
| Expansion × $10^7$, 1/° C. | 84.7 | 93.1 | 100.9 | 77.8 | 79.6 | 88.1 | N/A | N/A |

TABLE III-continued

Samples ARC–ARO

| Series 164 | ARC | ARD | ARE | ARG | ARH | ARI | ARJ | ARO |
|---|---|---|---|---|---|---|---|---|
| Density, g/mL | 3.206 | 2.856 | 2.51 | 3.433 | 3.34 | 2.961 | N/A | N/A |
| Ref Index | 1.581 | 1.551 | 1.522 | 1.605 | 1.595 | 1.559 | 1.568 | N/A |

TABLE IV

Samples ARK–ARM

| Series 164 | ARK | ARL | ARM |
|---|---|---|---|
| $SiO_2$ | 48 | 48 | 48 |
| BaO | 28 | 28 | 28 |
| $BaCl_2$ | 2 | 2 | 2 |
| $B_2O_3$ | 20 | 20 | 20 |
| $Al_2O_3$ | 5 | 5 | 5 |
| $Sm_2O_3$ | 5 | 0 | 0 |
| $TiO_2$ | 0 | 5 | 0 |
| $Ta_2O_5$ | 0 | 0 | 5 |
| Strain, °C. | 617 | 604 | 633 |
| Anneal, °C. | 652 | 639 | 672 |
| Softening Pt., °C. | 768 | 763 | N/A |
| Expansion × $10^7$, 1/°C. | 78.7 | 75.1 | 680 |
| Density, g/mL | N/A | 3.505 | 3.895 |
| Ref Index | 1.64 | 1.632 | 1.654 |

TABLE V

Samples ARU–ASK

| Series 164 | ARU | ARV | ARW | ARX | ARY | ARZ | ASA | ASB | ASK |
|---|---|---|---|---|---|---|---|---|---|
| $SiO_2$ | 48 | 48 | 48 | 48 | 48 | 48 | 48 | 48 | 48 |
| BaO | 21 | 16 | 11 | 6 | 26 | 26 | 26 | 26 | 18.5 |
| $BaCl_2$ | 2 | 2 | 2 | 2 | 2 | 2 | 2 | 2 | 2 |
| CaO | 5 | 10 | 15 | 20 | 0 | 0 | 0 | 0 | 7.5 |
| $Na_2O$ | 2 | 2 | 2 | 2 | 2 | 2 | 2 | 2 | 2 |
| $B_2O_3$ | 20 | 20 | 20 | 20 | 20 | 20 | 20 | 17 | 20 |
| $Al_2O_3$ | 5 | 5 | 5 | 5 | 4 | 6 | 8 | 5 | 5 |
| Strain, °C. | 584 | 580 | 587 | 589 | 587 | 586 | 583 | 585 | N/A |
| Anneal, °C. | 620 | 616 | 622 | 624 | 621 | 621 | 617 | 622 | N/A |
| Softening Pt., °C. | 748 | 745 | 748 | 748 | 744 | 745 | 745 | 744 | N/A |
| Expansion × $10^7$, 1/°C. | 74.8 | 73.1 | 72.4 | 69.1 | 79.3 | 75.3 | 76 | 80.8 | N/A |
| Density, g/mL | 3.294 | 3.147 | 2.995 | 3.825 | 3.437 | 3.413 | 3.371 | 3.443 | N/A |
| Ref Index | 1.597 | 1.592 | 1.584 | N/A | 1.603 | 1.602 | 1.596 | 1.603 | N/A |

TABLE VI

Samples ATB–ATQ

| Series 164 | ATB | ATC | ATD | ATE | ATN | ATP | ATQ |
|---|---|---|---|---|---|---|---|
| $SiO_2$ | 48 | 48 | 48 | 45 | 45 | 45 | 45 |
| $Al_2O_3$ | 5 | 5 | 5 | 5 | 5 | 5 | 5 |
| BaO | 15.5 | 13.5 | 13.5 | 13.5 | 13.5 | 13.5 | 13.5 |
| $BaCl_2$ | 2 | 2 | 2 | 2 | 2 | 2 | 2 |
| CaO | 6.5 | 6.5 | 6.5 | 6.5 | 5.5 | 55 | 5.5 |
| $CaF_2$ | 1 | 1 | 1 | 1 | 2 | 2 | 2 |
| $Na_2O$ | 5 | 7 | 7 | 7 | 7 | 7 | 7 |
| $B_2O_3$ | 20 | 20 | 20 | 20 | 20 | 20 | 20 |
| $As_2O_3$ | 0.1 | 0.1 | 0.1 | 0.1 | 0 | 0 | 0 |
| $CeO_2$ | 0.5 | 0.5 | 0.5 | 0.5 | 1 | 0.5 | 0.5 |
| $Fe_2O_3$ | 0 | 0 | 0 | 0 | 0 | 0.1 | 0.1 |
| $Pr_2O_3$ | 0 | 0 | 0 | 0 | 0 | 0.2 | 0.2 |
| $Dy_2O_3$ | 0 | 0 | 0 | 0 | 0 | 0.2 | 0 |
| Strain, °C. | N/A | N/A | 552 | 553 | N/A | N/A | N/A |
| Anneal, °C. | N/A | N/A | 588 | 588 | N/A | N/A | N/A |
| Softening Pt., °C. | N/A | N/A | 711 | 711 | 667 | N/A | N/A |

In the above Tables II–VI, values that were not measured are indicated by N/A.

The above borosilicate compositions can be varied according to a number of parameters in order to optimize the borosilicate for fiber applications. These parameters include viscosity matching the borosilicate cladding to the core (for fiberization), ensuring chemical compatibility between the borosilicate cladding and the core (to prevent deleterious reactions such as crystallization), and optimizing the index of refraction of the borosilicate material so that the refractive index of the borosilicate is less than that of the core (for waveguide purposes) and the numerical aperture of the clad/core falls within an acceptable range.

For example, as shown in the above tables, a first composition parameter that can be varied is the index of refraction of the borosilicate glass material. An important part of the effectiveness of a cladding glass composition in a fiber is matching the thermal and optical properties of the clad to the core. Preferably, the borosilicate glass has a refractive index (n) of from about 1.555 to about 1.68, based on a germanate core having an index of from about 1.6 to about 1.7.

Another composition parameter that can be varied is based on the numerical aperture (NA) of the resulting fiber. It is desirable to have a fiber NA (where $NA=(n_{core}^2-n_{clad}^2)^{1/2}$) of about 0.20 to about 0.45 for high pump intensities, while still maintaining reasonable coupling to conventional transmission fibers.

Another composition parameter that can be varied is based on matching the viscosity temperature dependence of the cladding glass to that of the core as closely as possible to enable fiberization. The thermal expansion coefficient of the cladding glass should also closely match that of the core glass to minimize stresses in the fiber, although a slightly less expansive clad is desirable to put the surface of the fiber under slight compression and increase the strength of the fiber.

For example, FIG. 1 shows the viscosity curves of a borosilicate glass compared with a germanate core glass. The borosilicate glass has the following composition: $48SiO_2 + 18.5BaO_2 + 2BaCl_2 + 7.5CaO + 2Na_2O + 20B_2O_3 + 5Al_2O_3$ and the germanate glass has the following composition: $70GeO_2 + 14Ga_2O_3 + 8.67BaO + 2BaF_2 + 2.67K_2O + 2.66Rb_2O + 0.1Tm_2O_3$. The data shows that the two curves are very well matched especially in the $10^5$ to $10^7$ Poise range where fiberization is commonly performed, as is understood by one of ordinary skill in the art. The data in Tables II–VI listed previously also show some of the ranges of thermal expansions and refractive indices that can be obtained, indicating that the borosilicate glasses of the present invention can be used to match a variety of germanate core glasses.

Figure 2:
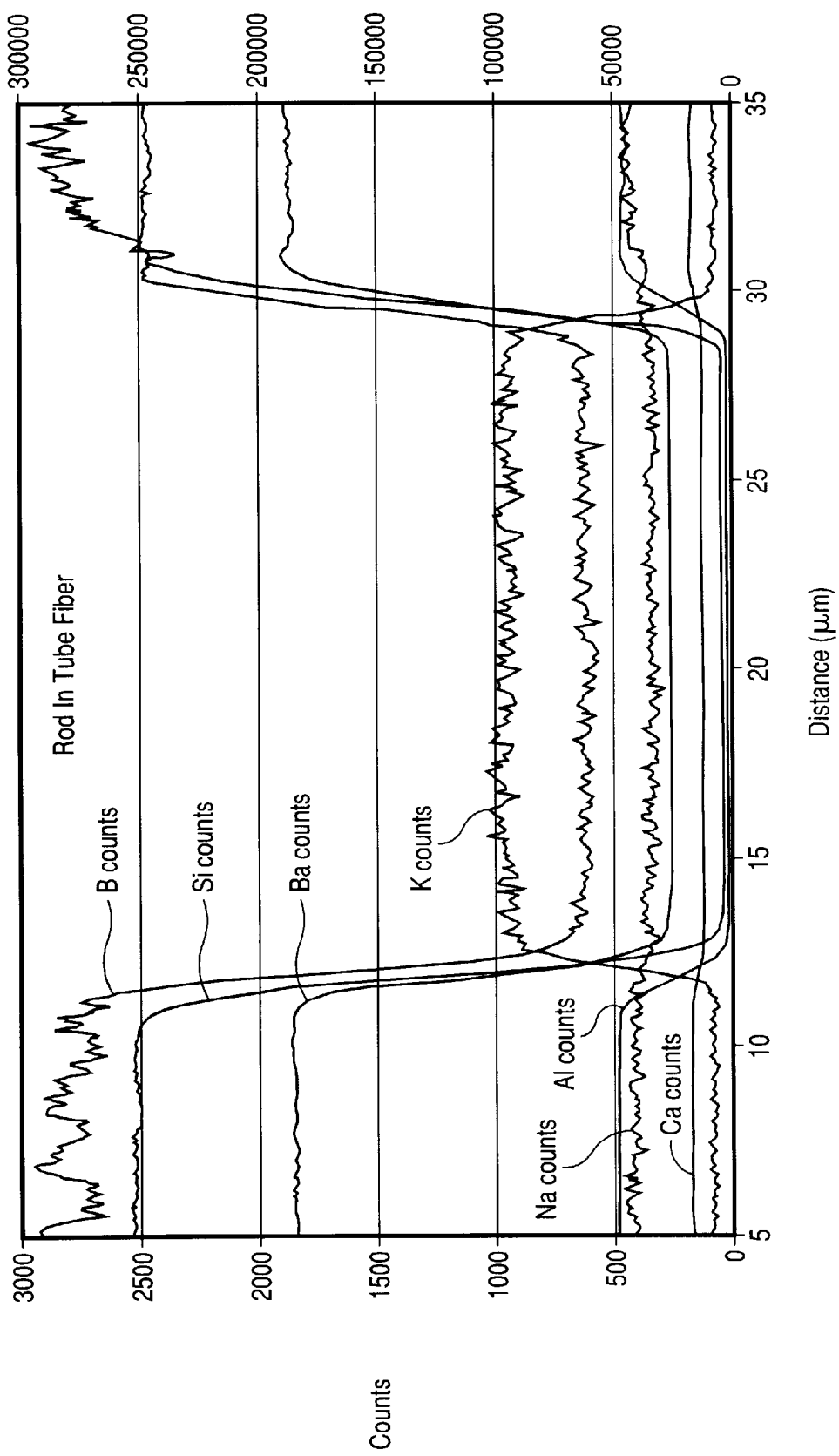
FIG. 2 shows a comparison compositional profile of a fiber with a germanate core and a borosilicate cladding according to an embodiment of the present invention.

FIG. 2 shows a composition profile of a resulting fiber showing that the core-clad interface is sharp and no diffusion has occurred. This is important since high frequency phonons from $SiO_2$ and $B_2O_3$ from the clad can be detrimental to the $Tm^{3+}$ ions in the germanate core in terms of upper state lifetime and amplification efficiency.

Figure 3:
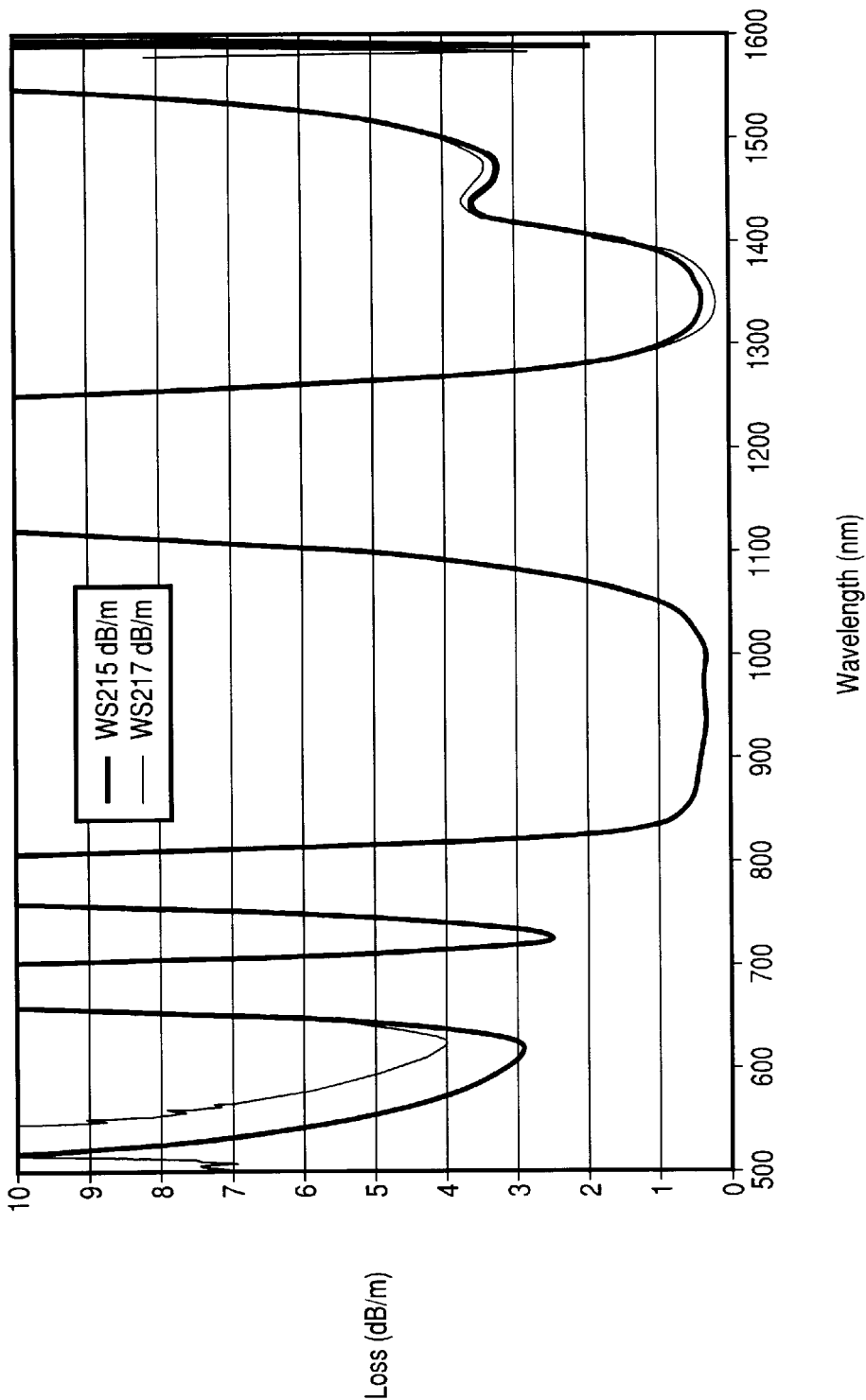
FIG. 3 shows a loss curve for a fiber having a borosilicate cladding according to an embodiment of the present invention and a germanate core.

Using the inventive compositions and process, a low loss fiber was produced using the rod in tube technique and a germanate core glass. The loss curve for the fiber is shown in FIG. 3. The background loss of the fiber is less than 0.5 dB/m and puts it in the useful range for a practical $Tm^{3+}$ amplifier. Further optimized fiberization should allow for lower loss, as would be apparent to one of skill in the art given the present description.

According to another embodiment of the present invention, a fiber amplifier for amplifying optical signals in the 1450 nm to 1530 nm wavelength region includes a borosilicate cladding and core comprising a Tm-doped germanate glass material. The borosilicate glass composition is described in detail above. The composition of the Tm-doped germanate core is described fully in a commonly owned and copending application entitled "Thulium-Doped Germanate Glass Composition and Device For Optical Amplification," by Dejneka et al.

Briefly, for the core material, the germanate-based glass has a $GeO_2$ glass former, $Ga_2O_3$, and alkali, and/or alkaline-earth oxides. $Ga_2O_3$ is preferable in a concentration of about 2 mole % to about 40 mole %, with a concentration of about 10 mole % to about 18 mole % being preferred.

The $Tm^{3+}$ ion can be introduced into the germanate glass composition as a particular concentration of $Tm_2O_3$. The Tm-dopant concentration can be from about 0.001 mole % to about 2 mole %, with a preferred concentration being from about 0.05 mole % to about 0.1 mole %. For example, acceptable results can occur for Tm concentrations of about 0.05 mole % (i.e., 0.16 weight %). Acceptable results can also occur for Tm concentrations of about 0.5 weight %.

Alkaline earth metal compounds and alkali metal compounds can also be incorporated into the germanate host material. For example, the alkaline earth compounds can include halides and oxides such as BaO, MgO, CaO, SrO, $BaF_2$, $MgF_2$, $CaF_2$, $SrF_2$ $BaCl_2$, $MgCl_2$, $CaCl_2$, $SrCl_2$, $BaBr_2$, $MgBr_2$, $CaBr_2$, $SrBr_2$, or combinations thereof. The alkaline earth metal compounds can help provide better chemical durability for the germanate host. In addition, the alkaline earth fluorides can help increase the lifetime of the Tm emission, which can increase the efficiency of optical amplification. Further, the alkaline earth halides can act as drying agents to strip out —OH during the growth process.

Second, alkali metal compounds can also be included in the germanate host. These alkali compounds can include halides and oxides such as $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, and $Cs_2Br_2$, and combinations thereof.

Third, intermediate elements and compounds (e.g., $Ta_2O_5$, $La_2O_3$, $Nb_2O_5$, $Al_2O_3$, $Sb_2O_3$, $As_2O_3$, and $CeO_2$) can be included. For example, $Ta_2O_5$ and $Nb_2O_5$ can be incorporated in sufficient amounts to increase the index of refraction of the germanate host material. $Al_2O_3$ can be incorporated in sufficient amounts to provide higher phonon energy to the germanate host material, increase durability, and/or decrease the germanate host index of refraction, if used in appropriate amounts. $Sb_2O_3$, $As_2O_3$, and/or $CeO_2$ can be incorporated in the germanate glass host as refining agents to help remove bubbles from the glass during formation by controling the oxidization state as an oxidizer.

Fourth, heavy metal oxides and compounds (e.g., PbO and/or $Bi_2O_3$) can be incorporated into the germanate host material.

Other materials such as $RE_2O_3$ (where RE represents all rare earth elements, such as La, Nd, Pr, Er, Y, Yb, Er, Sm, Gd, Lu, etc.), ZnO, $TiO_2$, $ZrO_2$, and $HfO_2$ can be incorporated in germanate host for various other purposes. For example, $La_2O_3$, $Gd_2O_3$, $Y_2O_3$, and $Lu_2O_3$ are transparent at the wavelength of interest and can help reduce internal absorption. Also, compounds such as $La_2O_3$, $Ta_2O_3$, PbO, and $HfO_2$ can be incorporated in differing amounts, depending on the desired index of refraction of the germanate material. With these particular modifier compounds, increased concentrations can lead to an increased (or in some cases, decreased) index of refraction.

In particular, a preferred germanate core can include one or more variations of the following composition: $GeO_2 + Ga_2O_3 + Tm_2O_3 + (AO + AX_2 + Z_2O + Z_2X_2) + $(optionally) one or more intermediate compounds, where A can be an alkaline earth metal such as Mg, Ca, Sr, or Ba, and Z can be an alkali metal such as Li, Na, K, Rb, or Cs. This composition provides a low phonon energy host for the $Tm^{3+}$ ion. In addition, chemical durability is improved over a fluoride-based material such as ZBLAN. Moreover, the lifetime of the $^3H_4$–$^3F_4$ transition can be over an order of magnitude greater than that demonstrated in Tm-doped silicate materials.

Table VII shows a first preferred range of concentrations of the aforementioned germanate glass composition constituents.

TABLE VII

Germanate Composition Concentrations

| Component | Concentration Ranges, including preferable and preferred ranges (in mole percent) |
|---|---|
| $Tm_2O_3$ | $0.001\% \leq Tm_2O_3 \leq 2\%$ (preferable), $0.05\% \leq Tm_2O_3 \leq 0.1\%$ (preferred) |

TABLE VII-continued

Germanate Composition Concentrations

| Component | Concentration Ranges, including preferable and preferred ranges (in mole percent) |
|---|---|
| $GeO_2$ | $GeO_2 \geq 20\%$, |
|  | $50\% \leq GeO_2 \leq 90\%$ (preferable), |
|  | $65\% \leq GeO_2 \leq 75\%$ (preferred) |
| $SiO_2$ | $SiO_2 \leq 40\%$ |
| $SiO_2 + GeO_2$ | $40\% \leq SiO_2 + GeO_2 \leq 80\%$ |
| ZnO | $0\% \leq ZnO \leq 40\%$ (preferable), |
|  | $0\% \leq ZnO \leq 5\%$ (preferred) |
| PbO | $0\% \leq PbO \leq 50\%$ (preferable), |
|  | $0\% \leq PbO \leq 10\%$ (preferred) |
| $Bi_2O_3$ | $0\% \leq Bi_2O_3 \leq 50\%$ |
| $PbO + Bi_2O_3$ | $0\% \leq PbO + Bi_2O_3 \leq 60\%$ |
| $Ga_2O_3$ | $Ga_2O_3 \geq 2\%$, |
|  | $2\% \leq Ga_2O_3 \leq 40\%$ (preferable), |
|  | $10\% \leq Ga_2O_3 \leq 18\%$ (preferred) |
| $Al_2O_3$ | $0\% \leq Al_2O_3 < 20\%$ (preferable), |
|  | $0\% \leq Al_2O_3 < 1\%$ (preferred) |
| $Ta_2O_5, Nb_2O_5$ | $0\% \leq Ta_2O_5 \leq 20\%$, |
|  | $0\% \leq Nb_2O_5 \leq 10\%$ (preferable), |
|  | $0\% \leq Ta_2O_5 \leq 2\%$ (preferable), |
|  | $0\% \; Nb_2O_5$ (preferred) |
| $Sb_2O_3$ | $0\% \leq Sb_2O_3 \leq 5\%$ (preferable), |
|  | $0\% \leq Sb_2O_3 \leq 1\%$ (preferred) |
| $As_2O_3$ | $0\% \leq As_2O_3 \leq 5\%$ (preferable), |
|  | $0\% \leq As_2O_3 \leq 1\%$ (preferred) |
| $CeO_2$ | $0\% \leq CeO_2 \leq 5\%$ (preferable), |
|  | $0 \leq CeO_2 \leq 2\%$ (preferred) |
| $RE_2O_3$ | $0\% \leq RE_2O_3 \leq 15\%$ (preferable), |
|  | $0\% \leq RE_2O_3 \leq 1\%$ (preferred) |
| $AX_2 + Z_2X_2$ | $0\% \leq AX_2 + Z_2X_2 \leq 10\%$ (preferable), |
|  | $0.1\% \leq AX_2 + Z_2X_2 \leq 4\%$ (preferred) |
| $TiO_2 + ZrO_2 + HfO_2$ | $0\% \leq TiO_2 + ZrO_2 + HfO_2 \leq 10\%$ (preferable), |
|  | $0\% \; TiO_2 + ZrO_2 + HfO_2$ (preferred) |
| $AO + AX_2$ | $0\% \leq AO + AX_2 \leq 40\%$ (preferable), |
|  | 7%–14% (preferred $AO + AX_2$), |
|  | 0–1% (preferred MgO), |
|  | 4%–10% (preferred CaO), |
|  | 0–5% (preferred Sro), |
|  | 2%–7% (preferred BaO) |
| $Z_2O + Z_2X_2$ | $0\% \leq AO + AX_2 \leq 20\%$ preferable), |
|  | 4%–6% (preferred $AO + AX_2$), |
|  | 0% (preferred $Li_2O$), |
|  | 0% (preferred $Na_2O$), |
|  | 2%–6% (preferred $K_2O$), |
|  | 2%–4% (preferred $Rb_2O$), |
|  | 2%–4% (preferred $Cs_2O$) |
| $(AO + AX_2 + Z_2O + Z_2X_2)/(Ga_2O_3 + Al_2O_3) = R_1$ | $0.4 \leq R_1 \leq 2.5$ (no units) (preferable), |
|  | $0.8 \leq R_1 \leq 1.25$ (no units) (preferred) |
| $(AO + AX_2)/(Z_2O + Z_2X_2) = R_2$ | Any ratio (preferable), |
|  | $1.8 \leq R_2 \leq 2.25$ (no units) (preferred) |

All of the compounds listed above, such as $GeO_2$, can comprise undoped or doped compounds that can be stoichiometric or slightly non-stoichiometric.

An example fiber fabrication process is now described. This fabrication method is described for example purposes only and is not intended as a limitation. Other fabrication methods will be apparent to those of ordinary skill in the art given the present description.

The constituent raw material powders (e.g., the oxides, chlorides, bromides, nitrates, and/or carbonates) are weighed and mixed to form a batch for the desired composition. As the person of skill in the art will appreciate, the alkali metal oxides and the alkaline earth metal oxides may be added as the corresponding carbonates or nitrates. The batch can then be placed in a refractory crucible, such as $SiO_2$ (or, e.g., platinum, $Al_2O_3$, and the like) and calcined at 300° C. to drive off physically absorbed water. The batch is then further heated to a melting temperature of 1350° C., to allow the batch materials to react and form a melt. Halogens (e.g., F, Cl, and Br) react with hydroxyl groups at these temperatures and form volatile HF, HCl, and/or HBr which further dries the glass melt, and also strips out deleterious transition metals. Once the melt is formed, it can be transferred to a Pt crucible to prevent siliceous cord from the $SiO_2$ crucible. The melt can be stirred and the temperature can be lowered to about 1150° C. to condition the melt for forming.

The melt can then be cast or drawn into tubing. For drawing the glass directly into tubing, the orifice temperature can be kept at about 900° C. 12 millimeter (mm) by 5 mm tubing can then be drawn at a rate of about 1 meter per minute using a conventional drawing tower. For casting, the melt can be poured into a preheated graphite mold (e.g., about 38 mm diameter) and then annealed at about 530° C. to relieve stress. The 38 mm billet can then be extruded into a 10 mm by 1 mm tubing at about 700° C. to about 800° C., preferably at about 750° C.

Once the tubing is formed, a core rod of germanate glass doped with $Tm^{3+}$ can be inserted in the tube to make a preform. The preform can then be drawn into a 125 micrometer ($\mu$m) diameter fiber with a core having a diameter of less than 8 $\mu$m, preferably less that 5 $\mu$m, and more preferably about 4 $\mu$m, at about 800° C. at a rate of about 20 meters per minute. An overclad can be formed by inserting a core clad preform into a secondary tube. The secondary tube can be doped with, for example, $Fe_2O_3$ to be highly absorbing in order to prevent cladding modes from propagating.

Accordingly, the borosilicate glasses according to the above embodiments can be drawn directly into tubing by a Velo-Draw process or via extrusion or other techniques, and subsequently drawn into fiber with a germanate core.

Figure 4A:
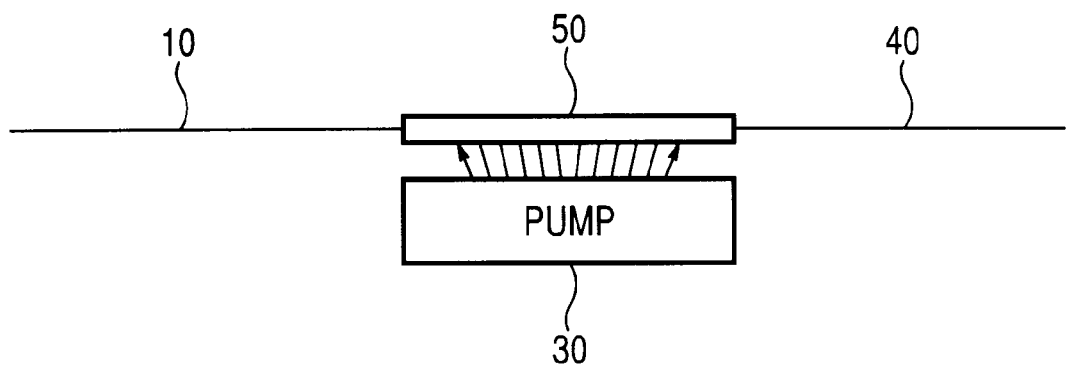
FIGS. 4A and 4B show Tm-doped germanate glass fiber amplifier with a borosilicate glass cladding according to an alternative embodiment of the invention.

The optical fibers of the present invention are suitable for use in an optical amplifier. The optical amplifier amplifies optical signals within the wavelength range of about 1450 nm to about 1530 nm, preferably about 1460 nm to about 1520 nm. FIG. 4A shows a schematic diagram of a fiber amplifier 50.

An input optical fiber 10 carries an optical signal having a wavelength of about 1450 nm to about 1530 nm. In this example, optical signal has a wavelength of about 1470 nm. Fiber 10 and output fiber 40 can be conventional silica-based optical fibers (with silica cores and claddings). The optical signal is amplified by fiber amplifier 50. Fiber amplifier 50 includes an input surface and an output surface. Optical amplification can be achieved over the wavelength range of interest using a Tm-doped germanate glass material core.

Figure 4B:
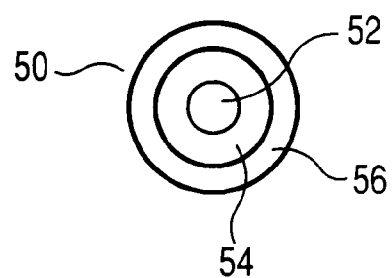

As shown in FIG. 4B, amplifying fiber 50 has a core 52 which includes the Tm-doped germanate glass material described previously. The Tm-doped germanate glass material can be drawn into fiber form using the fiber drawing techniques described previously. Fiber 50 also includes a borosilicate cladding 54, which can include a borosilicate composition described previously. Optionally, fiber 50 can also include an outer clad 56, which also comprises a borosilicate material. Preferably, the outer clad 56 has a different index of refraction than the inner clad 54.

Input fiber 10 and output fiber 40 can be optically coupled to fiber 50 using conventional fiber coupling techniques, as would be apparent to one of skill in the art given the present description.

In addition, the fiber 50 can be optically pumped by a pump source 30, such as a conventional laser diode (or other solid state laser or lamp) operating in the 780 nm–800 nm wavelength region. Alternatively, an infrared Raman laser (or the like) can be used to pump both the $^3H_6$-$^3F_4$ and the $^3F_4$-$^3H_4$ absorption bands simultaneously, in order to prevent possible deleterious up-conversion effects created when strongly pumping at 790 nm. Of course, any of a number of conventional pumping schemes can be utilized so that the Tm-doped germanate glass material can efficiently absorb light from the pump source 30, depending on the particular absorption characteristics of the Tm-doped germanate glass material, as will be apparent to one of skill in the art given the present description. As is also apparent, the borosilicate core can be designed to transmit or absorb as much of the pump light as desired for a given application. Accordingly, at least a portion of the light from pump source 30 is absorbed by the Tm-doped germanate core in fiber 50, in order to produce a population of $Tm^{3+}$ ions in the $^3H_4$ excited state. Optical amplification occurs through stimulated emission as is known. As a result, the optical signal 12 is amplified and the amplified signal is output along output fiber 40. The length of fiber 50 and the $Tm^{3+}$ concentration of the core can be modified depending on the overall requirements of an optical system or network that fiber 50 is incorporated.

Thus, according to the preferred embodiments of the present invention, a broad-band germanate core/borosilicate clad optical fiber amplifier can provide optical amplification over the 1400 nm–1530 nm wavelength band can be achieved utilizing Tm-doped germanate glass material.

While the above provides a full and complete disclosure of the preferred embodiments of the present invention, various modifications, alternate constructions, and equivalents may be employed without departing from the scope of the invention. Therefore, the above description and illustration should not be construed as limiting the scope of the invention, which is defined by the appended claims.

We claim:

1. An optical fiber amplification device, comprising:
   a borosilicate cladding that includes
      $SiO_2$ having a concentration of about 40 mole percent to about 60 mole percent;
      $B_2O_3$ having a concentration of about 10 mole percent to about 30 mole percent; and
      a first compound selected from the group consisting of BaO, MgO, CaO, SrO, $BaF_2$, $MgF_2$, $CaF_2$, $SrF_2$, $BaCl_2$, $MgCl_2$, $CaCl_2$, $SrCl_2$, $BaBr_2$, $MgBr_2$, $CaBr_2$, $SrBr_2$, $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, and $Cs_2Br_2$, and combinations thereof, and having a concentration of 10 mole percent to about 40 mole percent.

2. The optical fiber amplification device according to claim 1, further comprising:
   a germanate glass material core doped with $Tm^{3+}$ having a first surface configured to receive an optical signal having a wavelength of from about 1400 nm to about 1540 nm, and a second surface configured to output an amplified optical signal.

3. The optical fiber amplification device according to claim 2, wherein the borosilicate cladding has a first refractive index of about 1.555 to about 1.68 and the germanate core has a second refractive index of about 1.6 to about 1.7.

4. The optical fiber amplification device according to claim 2, wherein the numerical aperture at the first and second surfaces is about 0.25 to about 0.45.

5. The optical fiber amplification device according to claim 1, wherein the optical signal loss at 1350 nm is less than 1 dB/m.

6. The optical fiber amplification device according to claim 1, wherein the borosilicate cladding comprises:
   $SiO_2$ having a concentration of about 45 mole percent to about 50 mole percent;
   $B_2O_3$ having a concentration of about 15 mole percent to about 25 mole percent; and
   the first compound having a concentration of 20 mole percent to about 30 mole percent.

7. The optical fiber amplification device according to claim 6, wherein the first compound includes BaO, having a concentration of about 10 mole percent to about 30 mole percent, $BaCl_2$ having a concentration of about 0.1 mole percent to about 4 mole percent, CaO having a concentration of about 5 mole percent to about 15 mole percent, $CaF_2$ having a concentration of about 0.1 mole percent to about 4 mole percent, and $Na_2O$ having a concentration of about 2 mole percent to about 12 mole percent, and wherein the composition further includes:
   $CeO_2$ having a non zero concentration of less than about 2 mole percent.

8. The optical fiber amplification device according to claim 6, further comprising:
   an outer cladding surrounding the borosilicate cladding, and wherein the outer cladding comprises a borosilicate material having a different index of refraction than the borosilicate cladding.

9. The optical fiber amplification device according to claim 6, wherein the first compound comprises CaO having a concentration of about 5 mole percent to about 15 mole percent.

10. The optical fiber amplification device according to claim 6, wherein the first compound comprises BaO having a concentration of about 10 mole percent to about 30 mole percent.

11. The optical fiber amplification device according to claim 1, further comprising:
    a second compound selected from the group consisting of $Ta_2O_5$, having a non zero concentration of less than about 1 mole percent, $Al_2O_3$, having a concentration about 2 mole percent to about 10 mole percent, $Sb_2O_3$, having a non zero concentration of less than about 1 mole percent, and $CeO_2$, having a non zero concentration of less than about 2 mole percent.

12. The optical fiber amplification device according to claim 11, further comprising:
    a third compound selected from the group consisting of PbO, having a non zero concentration of less than about 10 mole percent and ZnO, having a non zero concentration of less than about 5 mole percent.

* * * * *